United States Patent [19]

Bandera

[11] 3,958,614

[45] May 25, 1976

[54] AUTOMATIC SCREWDRIVING MACHINE

[75] Inventor: Robert Bandera, Cran-Gevrier, France

[73] Assignee: GEDIC, Saint Jorioz, France

[22] Filed: Apr. 11, 1975

[21] Appl. No.: 567,333

[30] Foreign Application Priority Data

May 17, 1974 France ............................ 74.18146

[52] U.S. Cl. ............................................ 144/32 R

[51] Int. Cl.² ........................................ B23P 19/06

[58] Field of Search ............ 29/211 R, 208 C, 240; 144/32; 221/278; 227/112

[56] References Cited

UNITED STATES PATENTS

| | | | |
|---|---|---|---|
| 2,732,554 | 1/1956 | Knott | 227/112 |
| 2,785,400 | 3/1957 | McIlvin | 221/278 X |
| 3,314,458 | 4/1967 | Weber | 144/32 |
| 3,875,982 | 4/1975 | Mizu | 144/32 |

*Primary Examiner*—Al Lawrence Smith
*Assistant Examiner*—Gary L. Smith
*Attorney, Agent, or Firm*—Dowell & Dowell

[57] ABSTRACT

In a pneumatically actuated screwdriving machine having a tubular screw receiving nose which surrounds the rotatable screwdriver head and which may slide axially towards the body of the machine by being carried and guided by longitudinal rods secured to the said nose and slidably supported by the said body, one of these rods has a peripheral groove and acts as a movable slide valve member in cooperation with annular chambers provided within the body. When the nose has been pushed towards the body, the air under pressure admitted through the valve which controls the pneumatic motor of the machine is also supplied through a flexible air conduit to the selector of a screw feeding apparatus which takes a screw from the screw container of the apparatus, while when the nose is returned to its advanced position, the air conduit is depressurized and the screw is transferred towards the nose through a flexible screw conveying conduit.

5 Claims, 8 Drawing Figures

AUTOMATIC SCREWDRIVING MACHINE

The present invention relates to automatic screwdriving machines and it more particularly concerns those of the portable type in which the successive screws are fed into a tubular movable member or nose which is slidably connected with the body of the machine by means of longitudinal guides, in such a manner that when this nose is applied against the part into which a screw is to be driven, it slides backwards with respect to the body against the action of appropriate springs, the head of the screwdriver thus pushing the screw through the conventional openable outlet of the nose.

The machines of the kind in question are generally provided with a pneumatic motor and they are associated with an automatic screw feeding apparatus which supplies the screws to the nose. Such an apparatus generally comprises a vibrating container and a pneumatically actuated selector which receives one screw from the container whenever it is actuated by air pressure, and thereafter introduces this screw into a conveying conduit which opens into the nose of the screwdriving machine, the displacement of the screw through the conduit being ensured by a blast of pressurized air.

It is an object of the present invention to realize such an automatic screwdriving machine which includes means responsive to the displacement of the nose with respect to the body in order to control any other operation desired and more particularly the transfer of one screw from the feeding apparatus into the nose of the machine.

According to the present invention there is provided an automatic screwdriving machine of the kind comprising a body with a pneumatic motor which drives a screwdriver head, a tubular nose supported in front of the said body and co-axially to the said screwdriver head by longitudinal rods slidably carried by the said body, and valve means for controlling the said motor, wherein one of the said rods acts as a movable slide valve member in cooperation with annular chambers formed around its periphery within the said body for controlling admission and exhaust of air under pressure into and from an air conduit extending from the said machine.

The air conduit extending from the machine is preferably connected with the selector of a pneumatically actuated screw feeding apparatus of known construction connected by a screw conveying conduit with a nozzle which opens at an angle into the nose of the machine, for actuating the said selector automatically at the ends of the stroke of the nose with respect to the body of the machine in such a manner that the said selector takes a screw from the container of the said screw feeding apparatus when the said nose is pushed towards the said body and propells the said screw through the said screw conveying conduit by an air blast when the said nose reaches its advanced position with respect to the said body.

Figure 1:
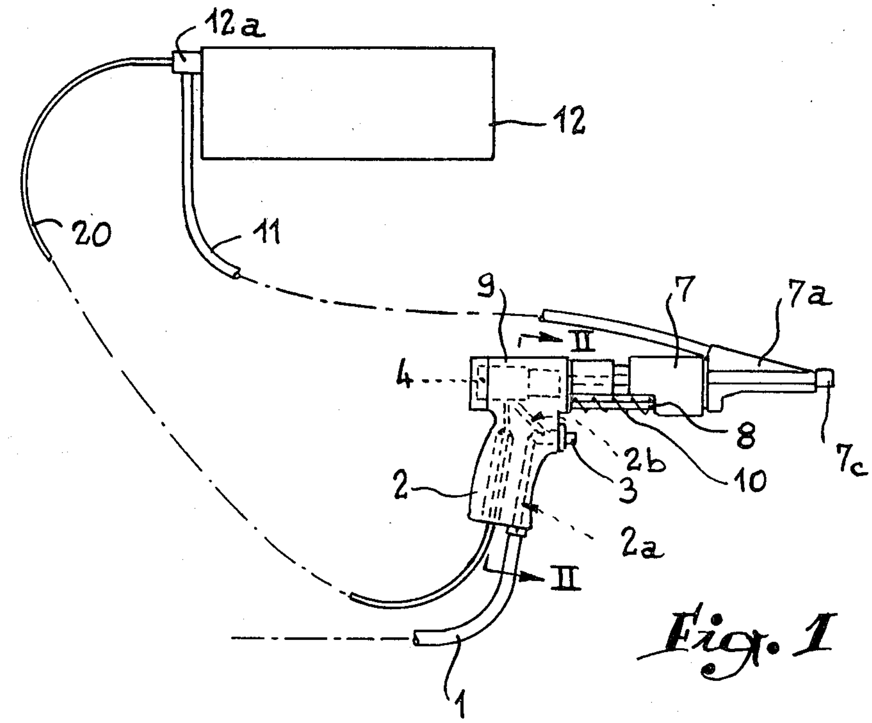
FIG. 1 is a general side view of a screwdriving machine according to the invention and of the feeding apparatus associated therewith.
Figure 2:
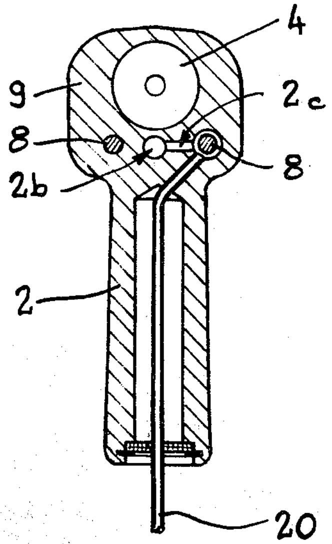
FIG. 2 is an enlarged vertical transverse section taken along line II—II of FIG. 1.
Figure 3:
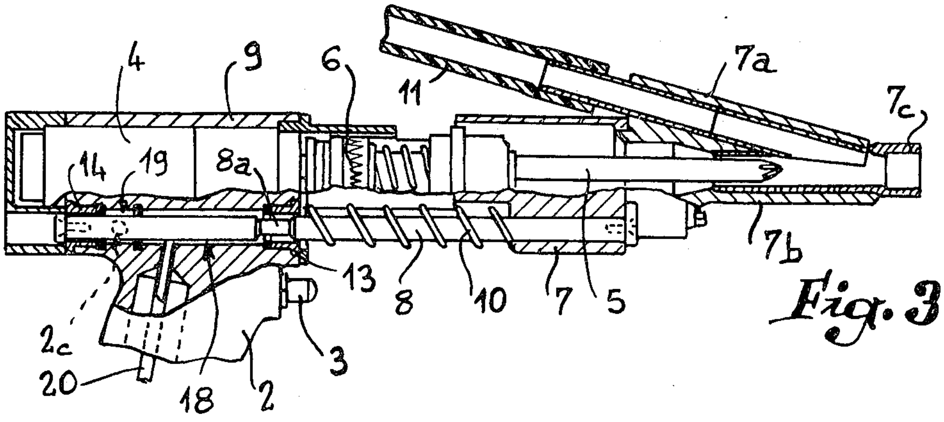
FIG. 3 is a vertical section of the machine.

The screwdriving machine illustrated in FIGS. 1 to 3 is of the pneumatic type. Air under pressure is supplied through a flexible conduit 1 the end of which is received in a bore 2*a* provided in the handle 2. This bore 2*a* communicates with an upper bore 2*b* through a handactuated controlling valve 3. Bore 2*b* in turn communicates with the pneumatic motor or turbine 4 of the machine. As indicated in FIG. 3 the shaft of motor 4 is connected through an overload clutch 6 with the usual screwdriver head 5. The free end of the said head 5 is engaged in a tubular front member or nose 7. Secured to this nose 7 are two parallel longitudinal guiding rods 8 which slide axially through the main body 9 integral with the handle 2 and which houses the pneumatic motor 4. A spring 10 is disposed on each of these rods between nose 7 and body 9 in order to urge the nose forwardly; this movement being limited by appropriate abutments secured to the free ends of rods 8. At this advanced position, which has been illustrated in FIGS. 1 and 3, the end of the screwdriver head 5 is situated within nose 7 rearwardly with respect to the outlet of an oblique screw feeding nozzle 7*a* which opens at an acute angle into nose 7.

It should besides be noted that the screwdriving machine as hitherto described is of conventional construction.

A flexible screw conveying conduit 11 (FIG. 1) connects the nozzle 7*a* with the selector 12*a* of a screw feeding apparatus 12, also of conventional design. Typical examples of screw feeding apparatus are shown in Knott U.S. Pat. No. 2,732,554; McIlvin U.S. Pat. No. 2,785,400; and Mizu et al. U.S. Pat. No. 3,875,982. In operation, when a screw has been fed into the receiving chamber 7*b* of nose 7, the machine is applied against the part into which the screw is to be driven, the operator pushes handle 2 and body 9 towards this part, while actuating valve 3. The pneumatic motor 4 thus rotates the screwdriver head 5, the latter engaging the screw which passes through the openable outlet 7*c* and is driven into the part against which the machine is pressed. When the screwdriving operation is ended, the clutch 6 slips in order to limit the torque exerted on the screwdriver head. The operator then disengages the machine from the part under consideration and he releases valve 3 so as to stop motor 4, springs 10 returning nose 7 to the advanced position of FIGS. 1 and 3. The screw feeding apparatus then introduces another screw into nose 7 for the next operating cycle.

In accordance with the present invention, and as clearly illustrated in FIGS. 4 to 7, one at least of the longitudinal guiding rods 8 is arranged in the manner of the movable member of a slide valve, being formed for that purpose with an annular groove or zone of lesser diameter 8*a*. This rod 8 slides in two spaced bushings 13, 14 secured to the body 9 of the machine, the annular space which they define around rod 8 being divided by three annular seals 15, 16, 17 into a front chamber 18 and a rear chamber 19. The front chamber 18 communicates with an air conduit 20 which extends through the handle 2 and is connected with the selector 12*a* of the screw feeding device 12 (see also FIGS. 1 and 2). As to the rear chamber 19, it is connected through a transverse canal 2*c* (FIG. 2) with the bore 2*b* through which air under pressure is supplied to the pneumatic motor 4 when valve 3 is actuated.

As above indicated, the screw feeding apparatus 12 is of conventional design, namely of the type wherein the selector 12*a* takes a screw from the vibrating container of the device whenever the air conduit 20 is pressurized, while when the pressure is released, the said selector delivers this screw to the screw conveying conduit 11 through which it is conveyed by the air blast resulting from the exhaust of compressed air from the container.

At the position of rest illustrated in FIG. 1 the annular groove 8*a* is situated within the front bushing 13 and the rear chamber 19 is thus wholly isolated from the front chamber 18 by the intermediate seal 16. This rear chamber 19 is pressurized when valve 3 is actuated but this has no effect on conduit 20 and therefore selector 12*a* remains ineffective.

It is to be noted that at this position of rod 8 the front seal 15 is disengaged from the periphery of rod 8 and that therefore chamber 18 communicates with the outer atmosphere through the unavoidable clearance between the rod and the front bushing.

Figure 4:
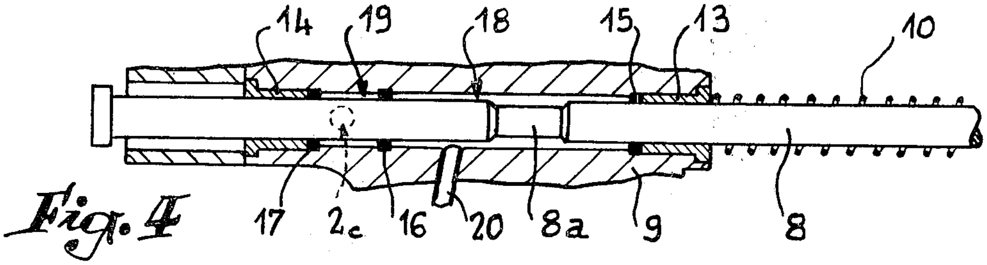
FIGS. 4 to 7 are enlarged fragmental vertical axial sections which illustrate the successive operative steps of this machine.

FIG. 4 shows the position of rod 8 during the screwdriving operation. The annular groove 8*a* is now wholly within the front chamber 18 and the front seal 15 engages the periphery of the said rod, thus avoiding any noticeable air leak. The front chamber 18 is still isolated from the rear chamber 19.

Figure 5:
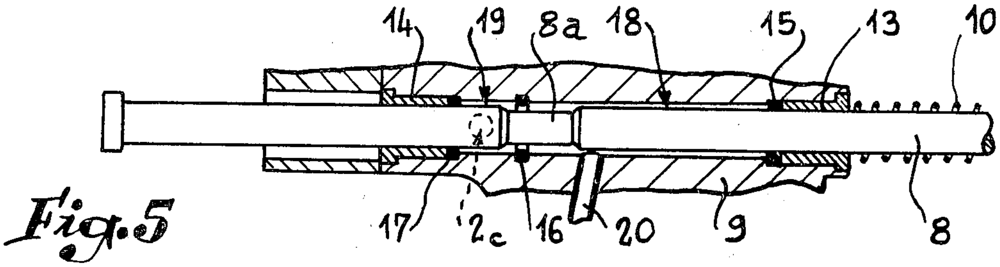

At the end of the rearward stroke of nose 7 with respect to body 9, i.e. when the screw is substantially fully screwed down, groove 8*a* begins passing through the intermediate seal 16, as illustrated in FIG. 5, thus connecting both chambers 18 and 19 with each other. The air under pressure which fills chamber 19 therefore flows through conduit 20 and actuates selector 12*a* (FIG. 1) which takes a screw from the vibrating container of the feeding apparatus 12.

Figure 6:
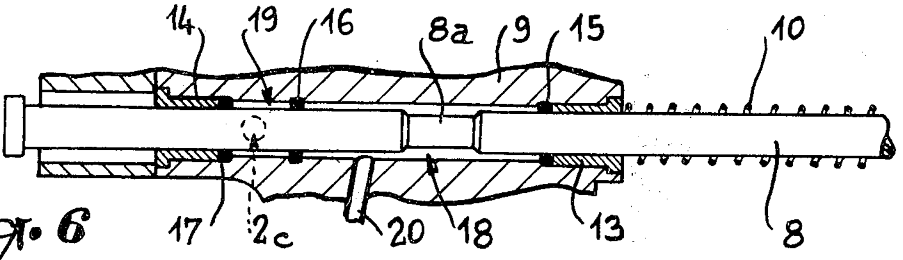
Figure 7:
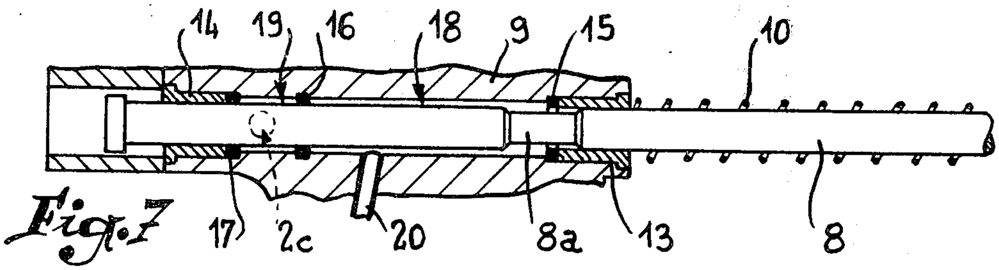

When the operator relieves the pressure exerted by the screwdriving machine against the part into which the screw has been driven, nose 7 moves forwardly with respect to body 9 together with rod 8 under the action of spring 10. During this return movement, groove 2*a* again passes through the front chamber 18, as illustrated in FIG. 6, thus isolating this chamber from chamber 19. The feeding apparatus 12, and more particularly its selector 12*a* therefore remains pressurized. But just before the end of this return stroke groove 8*a* again enters the front bushing 13 beyond the front seal 15 (see FIG. 7). The air under pressure of conduit 20 may thus exhaust to the outer atmosphere, selector 12*a* is actuated and it introduces the screw into the screw conveying conduit 11 through which it is propelled by the blast of the residual compressed air exhausting from the container of the feeding apparatus 12. The screw is thus positioned within nose 7 for the next screwdriving operation.

Figure 8:
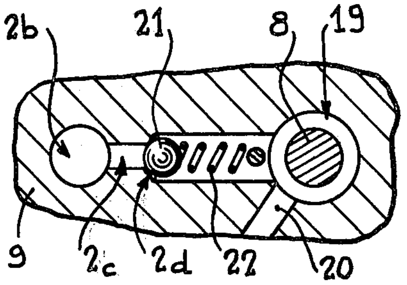
FIG. 8 is an enlarged sectional view illustrating a modification.

It may be of advantage to insert a non-return valve in the canal 2*c* (FIG. 8) between the upper bore 2*b* and the rear chamber 19 in order that if the operator releases the valve 3 before the slidable nose 7 reaches its advanced position, compressed air from the feeding apparatus 12 may be prevented from escaping through the pressure conduit 20 and through the pneumatic motor 4. In the example illustrated this valve is comprised of a ball 21 urged by a spring 22 against a shoulder 2*d* of canal 2*c*.

The screwdriving machine thus described prevents the possibility that a fresh screw may be conveyed into the receiving chamber 7*b* of nose 7 before the screwdriver head 5 has fully cleared the said chamber. Any jamming is therefore avoided. The feeding of the next screw only occurs when the nose 7 has fully returned to its position of rest of FIG. 1. When the non-return valve is provided, this safe operation is ensured even if the operator releases valve 3 well before the free end of the nozzle is disengaged from the part into which the preceding screw has been driven.

It is further to be understood that the slide valve device formed by rod 8, groove 8*a* and chambers 18, 19 could be used for other purposes than the feeding of the next screw into the nose of the machine.

I claim:

1. An automatic screwdriving machine driven by pneumatic pressure delivered to it through an air conduit and the machine being supplied through a screw conveying conduit with one screw at a time from screw feeding apparatus in response to a change of pressure in a pressure sensing conduit extending from the screw driving machine to the screw feeding apparatus, said screw driving machine comprising:

a body having a rear end and a front end and having bore means including at least one bore extending through said front end;

a pneumatic motor in the body and carrying a screwdriver head extending a fixed distance from the front end of the body parallel to said bore means and offset therefrom, the pneumatic motor being connected with said air conduit;

a tubular screw receiving nose having a screw receiving chamber coaxial with the screwdriving head, the nose having rearwardly extending rod means offset from the chamber and reciprocably mounted in said bore means and attaching the nose to the body;

spring means surrounding the rod means and urging the nose frontwardly with respect to the body to an extended position wherein a portion of the screw receiving chamber extends beyond the screwdriving head, said screw conveying conduit obliquely joining said portion of the screw receiving chamber, and the nose progressively retracting so that the rod means moves rearwardly in said bore means while a screw within said chamber is being driven; and valve means in said at least one bore responsive to the position of the rod means in the bore to selectively couple air pressure from said air conduit with said pressure sensing conduit, the valve means being operative each time the nose returns to extended position to deliver to the sensing conduit a change in pressure which actuates said screw feeding apparatus to supply a screw through the screw conveying conduit to said chamber.

2. The automatic screwdriving machine as set forth in claim 1, wherein said valve means comprises in said one bore multiple successive gas-tight chambers through which a rod means extends, the rod means having a zone of reduced diameter serving as a slide valve for interconnecting adjacent gas-tight chambers, the sensing conduit being coupled with one of the gas-tight chambers and being successively pressurized and vented by movements of the rod means.

3. The automatic screwdriving machine as set forth in claim 2, wherein there are three successive chambers in the valve means, including a center chamber coupled with the sensing conduit, a rear chamber coupled with the air conduit, and a forward chamber vented to the atmosphere, and said zone of reduced diameter of the rod means interconnecting the center and the forward chamber when the nose is in extended position.

4. The automatic screwdriving machine as set forth in claim 3, wherein the center and rear chambers are disposed so that the zone of reduced diameter of the rod means interconnects them when the nose is in retracted position.

5. The automatic screwdriving machine as set forth in claim 3, wherein a manually operated valve controls the flow of air from the air conduit to the motor, and the body has a duct connecting the air conduit on the side of the manual valve with the rear chamber, and a check valve in the duct operative to admit air from the conduit to the rear chamber but to block reverse flow of air in the duct.

* * * * *